US009550500B2

(12) United States Patent
Hackenberg et al.

(10) Patent No.: US 9,550,500 B2
(45) Date of Patent: Jan. 24, 2017

(54) METHOD FOR DRIVER ASSISTANCE SYSTEM OF A VEHICLE

(71) Applicant: Volkswagen AG, Wolfsburg (DE)

(72) Inventors: Linn Hackenberg, Wolfsburg (DE); Lennart Bendewald, Wolfsburg (DE); Ina Petermann-Stock, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/504,062

(22) Filed: Oct. 1, 2014

(65) Prior Publication Data

US 2015/0094899 A1    Apr. 2, 2015

(30) Foreign Application Priority Data

Oct. 1, 2013 (DE) .......... 10 2013 219 887

(51) Int. Cl.
| | |
|---|---|
| *B60W 50/14* | (2012.01) |
| *B60W 50/08* | (2012.01) |
| *B60K 28/06* | (2006.01) |
| *B60K 28/14* | (2006.01) |
| *B60W 50/00* | (2006.01) |

(52) U.S. Cl.
CPC ............. *B60W 50/14* (2013.01); *B60K 28/06* (2013.01); *B60K 28/14* (2013.01); *B60W 50/082* (2013.01); *B60W 2050/0072* (2013.01); *B60W 2540/18* (2013.01); *B60W 2540/22* (2013.01); *B60W 2550/143* (2013.01); *B60W 2550/22* (2013.01); *B60W 2550/402* (2013.01)

(58) Field of Classification Search
CPC ................ B60W 50/14; B60W 50/082; B60W 2550/143;B60W 2540/18; B60W 2550/22; B60W 2050/0072; B60W 2540/22; B60W 2550/402; B60K 28/14; B60K 28/06
USPC .......................................................... 701/23
See application file for complete search history.

(56) References Cited

U.S. PATENT DOCUMENTS

| | | | |
|---|---|---|---|
| 6,226,570 B1 * | 5/2001 | Hahn ................... | B60K 28/066 701/1 |
| 8,954,217 B1 * | 2/2015 | Montemerlo ......... | B60W 30/00 701/26 |
| 2012/0101701 A1 | 4/2012 | Moshchuk et al. | |

(Continued)

FOREIGN PATENT DOCUMENTS

| | | |
|---|---|---|
| DE | 197 43 024 | 4/1999 |
| DE | 10 2007 039 375 | 5/2009 |

(Continued)

*Primary Examiner* — Brian P Sweeney
(74) *Attorney, Agent, or Firm* — Andrews Kurth Kenyon LLP (57) ABSTRACT

A driver assistance system of a vehicle where the driver assistance system is able to control the vehicle at least partially automatically, a method alerts the driver to retake control of the vehicle from the driver assistance system based on the distance between the current location of the vehicle and an end of the autopilot capable route section. An end of an autopilot route section in a route planned for the vehicle is determined and distance information is determined between a current position of the vehicle and the end of the autopilot route section. The distance information is compared to a first and a second threshold value, and a first or a second indication is output as a function thereof.

16 Claims, 3 Drawing Sheets

(56) References Cited

U.S. PATENT DOCUMENTS

| | | | | |
|---|---|---|---|---|
| 2012/0296539 A1* | 11/2012 | Cooprider | ............ | B60W 10/06 |
| | | | | 701/70 |
| 2014/0156133 A1* | 6/2014 | Cullinane | ............ | B60W 30/00 |
| | | | | 701/23 |
| 2014/0240114 A1* | 8/2014 | Waeller | ................ | B60Q 9/008 |
| | | | | 340/435 |

FOREIGN PATENT DOCUMENTS

| | | | | |
|---|---|---|---|---|
| DE | 10 2010 053964 A1 * | 8/2011 | ............ | B60W 30/12 |
| EP | 2 392 501 A2 | 12/2011 | | |

\* cited by examiner

# METHOD FOR DRIVER ASSISTANCE SYSTEM OF A VEHICLE

CROSS REFERENCE TO RELATED APPLICATIONS

The present application claims priority to Application No. 10 2013 219 887.6, filed in the Federal Republic of Germany on Oct. 1, 2013, which is expressly incorporated herein in its entirety by reference thereto.

FIELD OF THE INVENTION

The present invention relates to a method for a driver assistance system of a vehicle, in particular for a driver assistance system that is able to control the vehicle at least partially automatically with the aid of a so-called autopilot function. The present invention relates in particular to an output of information in order to return the responsibility for driving to the driver at the end of a roadway section drivable by the autopilot function. The present invention relates furthermore to a driver assistance system designed for carrying out this method.

BACKGROUND INFORMATION

Vehicles, in particular passenger cars or cargo trucks for road traffic, are increasingly equipped with driver assistance systems that allow for the vehicle to be driven in road traffic partially or even fully automatically. Under certain conditions, such driver assistance systems are able to control both the lateral guidance as well as the longitudinal guidance of the vehicle autonomously. If an automatic guidance of the vehicle is possible with the aid of the driver assistance system, a driver of the vehicle does not have to monitor this automatic guidance permanently, but is able to hand over the guidance of the vehicle to a so-called autopilot function of the driver assistance system at a desired point in time and later take back the responsibility for driving. When the guidance of the vehicle is taken over by the autopilot function, the driver is able to devote himself at least partially to other activities. When the autopilot function recognizes that a route section is coming up along which the autopilot function is not able to control the vehicle automatically, or when the autopilot function recognizes a driving situation or situation in the surroundings, in which the autopilot function is not able to guide the vehicle automatically, the driver assistance system asks the driver to take over the guidance of the vehicle.

In this context, German Patent Application Publication No. DE 19 743 024 describes a motor vehicle having the means for temporary autonomous vehicle guidance and for the communication of a vehicle user with at least one electronic communication system. An operating device is provided by which it is possible to activate the communication means for the purpose of carrying out a communication process and to activate the vehicle guidance means for the purpose of autonomous vehicle guidance. When recognizing that a manual vehicle guidance is becoming necessary, the activated vehicle guidance means communicates takeover information to the communication means, which indicates this takeover information on a display device.

German Patent Application Publication No. DE 10 2007 039 375 relates to a motor vehicle comprising a longitudinally guiding driver assistance system having a stop-and-go function with a detection device for detecting information concerning a preceding vehicle. Using the driver assistance system, it is possible to brake the motor vehicle automatically to a standstill as a function of the information ascertained by the detection device, and to start up the motor vehicle again automatically as a function of an activation signal provided by the driver via an input device when a renewed startup of the preceding vehicle is detected.

SUMMARY

A reliable handover of the responsibility of driving from the driver assistance system back to the driver of the vehicle is of great importance for traffic safety. Particularly in critical situations, it is necessary to ensure a quick and reliable takeover on the part of the driver of the responsibility for guiding the vehicle. On the other hand, it is desirable that the driver does not receive unnecessary requests to take over the vehicle guidance in order to ensure an acceptance of the automatic vehicle guidance. Exemplary embodiments of the present invention therefore provide a suitable information output for a driver assistance system for handing over the responsibility of driving from an autopilot function to the driver.

The term autopilot function, or autopilot for short, will be used in connection with the exemplary embodiments of the present invention. The autopilot function concerns a function of a driver assistance system, which is capable of controlling the vehicle automatically at least in certain situations or on certain roads such as expressways or country roads for example. That is to say, the autopilot function takes over the longitudinal guidance and/or the lateral guidance of the vehicle and controls the vehicle without intervention or assistance on the part of the driver. Controlling the vehicle with the aid of the autopilot function is also called highly automated driving or autonomous driving.

According to example embodiments of the present invention, a method is provided for driver return from a driver assistance system of a vehicle. The driver assistance system is able to control the vehicle at least partially automatically using an autopilot function for example. The method involves the determination of an end of an autopilot route section in a route planned for the vehicle. An autopilot route section in this context refers to a route section along which the driver assistance system is able to control the vehicle automatically. At the end of the autopilot route section, the automatic control of the vehicle by the driver assistance system is terminated. The end of the autopilot route section may be due to an end of a type of road such as a country road or an expressway, for example. Furthermore, the driver assistance system may determine the end of the autopilot route section on the basis of a current traffic situation, it being possible for the traffic information to be detected, for example, with the aid of sensors of the vehicle, such as a camera for example, and, additionally or alternatively, to be provided by a traffic administration system or a traffic guidance system for example. Furthermore, a distance information between a current position of the vehicle and the end of the autopilot route section is determined in the method. The current position of the vehicle may be determined for example using a satellite-based position determination system. The distance information is compared to a first threshold value and a first indication information is output as a function of the comparison of the distance information to the first threshold value. The distance information is furthermore compared to a second threshold value and a second indication information is output as a function of the comparison of the distance information to the second threshold value. The first and second indication information may include different types of indications, which ask the driver to take over the guidance of the vehicle since the end of the autopilot route section will soon be reached. The first and second indication information may express different urgencies for taking over the guidance of the vehicle. Thus, initially for example, in the event of a low urgency, a rather unobtrusive indication may be output to the driver and a second indication may be output if the urgency rises, which accordingly expresses the higher degree of urgency. Expressed differently, the driver initially may be alerted gently by the first indication information to the fact that he should take over the vehicle guidance soon, and the driver may be asked again, somewhat more forcefully by the second indication information to take over the guidance of the vehicle. Thus it is possible to ensure that the driver takes over the guidance of the vehicle in a timely manner, but nevertheless is not being asked to do so by the driver assistance system with unnecessary frequency or unnecessary forcefulness.

The output of the first or second indication information may include for example an activation of a lighting device in the interior of the vehicle. The lighting device may include for example a light in an instrument cluster or a dashboard of the vehicle. Alternatively or additionally, a fan device may be activated in the vehicle in order to give the driver an indication that an end of the autopilot route section will soon be reached. Alternatively or additionally, a vibration device, for example in a seat, for example in the driver's seat of the vehicle, may be also be activated for outputting the first and second indication information. Furthermore, an acoustic signal may be output for outputting the first or second indication information, for example an indicator chime or a certain signal sequence. Furthermore, for example a text information may be output on a display unit in the vehicle as the first or second indication information. The text information may be output for example in an instrument cluster or on a display unit of a so-called head unit of a multimedia system or a navigation system of the vehicle. The text information may include for example an indication that shows the distance from the end of the autopilot route section. Furthermore, for outputting the first or second indication information, an acoustic voice output in the vehicle may be used that communicates a respective message to the driver. Alternatively or additionally, for outputting the first and second indication information, a belt tensioner of the vehicle may be activated, for example the belt tensioner of the driver's seat, in order thus to "arouse" the driver and so to indicate that the driver should attend shortly to the task of guiding the vehicle. Finally, as an alternative or in addition to outputting the first or second indication information, it is possible to adjust the steering wheel of the vehicle. The steering wheel may be adjusted automatically, for example, from a position near the instrument cluster into a position further removed from the instrument cluster in the direction of the driver in order thereby to prompt the driver to grasp the steering wheel for guiding the vehicle. The previously described alternatives, as to how the first or second indication information may be communicated, may be associated at will with the first or second indication information. If the first indication information, for example, is to represent rather gentle indications, then the output of the first indication information may include for example an activation of the lighting device, an activation of the fan device, an activation of the vibration device or an output of the text information. Assuming that the second indication information is output in the event of a shorter distance and thus a higher degree of urgency, then the output of the second indication information may include for example in particular an output of the acoustic signal, an output of the acoustic voice output, an activation of the belt tensioner or an activation of the steering wheel adjustment.

According to an exemplary embodiment, the first threshold value may be greater than the second threshold value. The first indication information is output if the distance information is smaller than the first threshold value, and the second indication information is output if the distance information is smaller than the second threshold value. Expressed differently, in the event of an approach of the end of the autopilot route section, initially the first threshold value is undershot and thus initially the first indication information is output, which represents for example a discreet or gentle request that the driver take over the driving tasks, and with a further approach of the end of the autopilot route section the second indication information is output, which further makes it clear to the driver that his intervention in the vehicle guidance will be necessary. The stepwise output of indications with rising urgency makes it possible to direct the driver reliably and without hurry back to the task of driving.

In an exemplary embodiment, the output of the second indication information includes an output of an instruction to take action, which describes an action to be performed by the driver of the vehicle for guiding the vehicle. The instruction to take action may indicate to the driver for example that at the end of the autopilot route section, the driver must take an exit or must turn off into a street.

In an exemplary embodiment, the distance information may be compared to a third threshold value. The third threshold value is smaller than the first and second threshold value. A warning information is output as a function of the comparison of the distance information to the third threshold value. The warning information may be output for example when the third threshold value is undershot. As a result, when the vehicle approaches the end of the autopilot section, initially the first indication information is output, then the second indication information and, in a further approach, the warning information. For outputting the warning information, an additional lighting device in the interior of the vehicle may be activated for example, an additional acoustic signal may be output, an additional voice output may be triggered, the belt tensioner may be activated further or more forcefully, the steering wheel may be adjusted, or the braking system of the automobile may be activated briefly in order to produce a jerky deceleration of the vehicle. The warning information therefore provides very intrusive outputs, by which the driver may be asked to take over the guidance of the vehicle in a timely manner prior to the end of the autopilot route section.

In an exemplary embodiment, the distance information may be compared to a fourth threshold value, which is smaller than the first, the second and the third threshold value. If the distance information falls below the fourth threshold value, then the vehicle is stopped automatically or is steered automatically into a specific position on the roadway, for example into a right driving lane, a breakdown lane or a shoulder of the roadway. If the driver, in spite of the first indication information, the second indication information and the warning information, has not taken over the guidance of the vehicle, then the driver assistance system, when the fourth threshold value is undershot, steers the vehicle automatically into a safe position, for example to the shoulder of the roadway, and parks the vehicle there. This makes it possible to ensure that the vehicle is not operated driverlessly on a route section on which an automatic guidance of the vehicle using the autopilot function is not possible.

According to an exemplary embodiment, the distance information between the current position of the vehicle and the end of the autopilot route section includes an anticipated driving time from the current position to the end of the autopilot route section. This anticipated driving time may be calculated for example from a distance between the current position and the end of the autopilot route section, by taking into account traffic forecasts and route information of the route section between the current position and the end of the autopilot route section. The threshold values one through four, which were described above, may in this case include times, as will be described in more detail below. By controlling the indication information and the warning information as well as the automatic stop of the vehicle by comparisons on the basis of time, a more uniform behavior of the driver assistance system may be achieved at varying speeds. For example, the first indication information may be output, independently of a current traffic situation and a speed of the vehicle, always at a specific point in time prior to reaching the end of the autopilot route section.

On the condition that the distance information is available as a probable driving time, according to an exemplary embodiment, the first threshold value may have a value greater than 15 seconds, preferably in a range of 16-25 seconds and further preferably a value of 20 seconds. By a discreet first indication, the driver may thus be alerted sufficiently early prior to reaching the end of the autopilot route section to the imminently required takeover of the vehicle guidance. The second threshold value may be selected in a range of 8-15 seconds and preferably have a value of 10 seconds. 8-15 seconds normally give the driver sufficient time to familiarize himself with the current driving situation and to take over the vehicle guidance in a calm manner. The third threshold value may have a value in a range of 0-8 seconds and preferably a value of 6 seconds. When the third threshold value is undershot, the warning information is output, i.e. it is now high time for the driver again to take over the guidance of the vehicle. A quick takeover of the vehicle guidance, however, is by all means still possible in this time interval of 0-8 seconds. The fourth threshold value may have a value in the range of 0-5 seconds and preferably a value of 0 seconds. In order to bring the vehicle automatically into a specific safe position and/or to stop it automatically, a certain time is required depending on the driven speed. The indicated range for the fourth threshold value and the preferred value generally offer the driver assistance system the possibility of bringing the vehicle into a safe position and to park it, if indicated.

In an exemplary embodiment, an activity of the driver may be detected, while the vehicle is automatically guided along the autopilot route section. Furthermore, a state of the driver may be detected, for example a fatigue of the driver, while the vehicle is automatically guided along the autopilot route section. The first, second, third or fourth threshold value may be set as a function of the activity and of the state of the driver. The activity of the driver may be detected for example in that a touch of the steering wheel of the vehicle on the part of the driver is detected or a viewing direction of the driver is detected using suitable sensors. Furthermore, on the basis of a foot position or a body position of the driver, it is possible to detect whether the driver is turning towards a passenger for example, or whether the driver has again turned in the direction of the steering wheel and the foot controls in order to take over the task of driving. If it is possible to determine on the basis of the activities of the driver that the driver is paying attention to road traffic and prepares to take over the guidance of the vehicle, then it is possible to lower the threshold values, as a result of which the indication information and warning information are accordingly output later. If fatigue of the driver is detected, then the threshold values may be raised in order to give the driver more time to react. It is clear that as soon as the driver takes over the vehicle guidance and thus the autopilot function of the driver assistance system is deactivated, no indication information or warning information is output and the vehicle is also not stopped automatically or steered automatically into the safe position.

In an exemplary embodiment, a state information of the vehicle may be detected, while the vehicle is automatically guided along the autopilot route section. The first, second, third and/or fourth threshold value may be set as a function of the state information of the vehicle. The state information of the vehicle may include for example a speed of the vehicle. The threshold values, for example, may be increased with rising speed in order to give the driver sufficient time even at high speeds to grasp the current traffic situation before manually taking over again the guidance of the vehicle.

In an exemplary embodiment, a state information in the surroundings of the vehicle may be detected, while the vehicle is automatically guided along the autopilot route section. The first, second, third and/or fourth threshold value may be set as a function of the state information in the surroundings of the vehicle. The state information in the surroundings of the vehicle may include for example a brightness of the surrounding area, a time of day, a weather condition or a traffic density. In the event of poor visibility, for example, at night, in rain or snowfall or in the event of high traffic density, the threshold values may be raised in order to give the driver sufficient time to familiarize himself with the current traffic situation before taking over the guidance of the vehicle.

A driver assistance system for a vehicle is provided as well. The driver assistance system is able to control the vehicle at least partially automatically. For this purpose, the driver assistance system may have a so-called autopilot function, which manages to control vehicle automatically by interventions into the longitudinal guidance and the lateral guidance of the vehicle. The driver assistance system includes an output device and a processing device. The processing device is able to determine an end of an autopilot route section in a route planned for the vehicle, while the driver assistance system controls the vehicle automatically in this autopilot route section. The automatic control ends at the end of the autopilot route section. Expressed differently, the driver assistance system is able to control the vehicle automatically in the autopilot route section, but it is not able to control the vehicle automatically after the end of the autopilot route section. The processing device furthermore determines a distance information between a current position of the vehicle and the end of the autopilot route section. The distance information is compared to a first threshold value and on the basis of this comparison a first indication information is output using the output device. The processing device furthermore compares the distance information to a second threshold value and outputs a second indication information via the output device as a function of the comparison of the distance information to the second threshold value. The driver assistance system is thus suitable for carrying out the previously described method and hence also includes the previously described advantages.

Furthermore, a vehicle having the previously described driver assistance system is provided. The vehicle therefore also includes the advantages described previously in connection with the method and may in particular be controlled at least partially automatically without intervention of the driver.

Example embodiments of the present invention are described in more detail below with reference to the appended figures.

DETAILED DESCRIPTION

Figure 1:
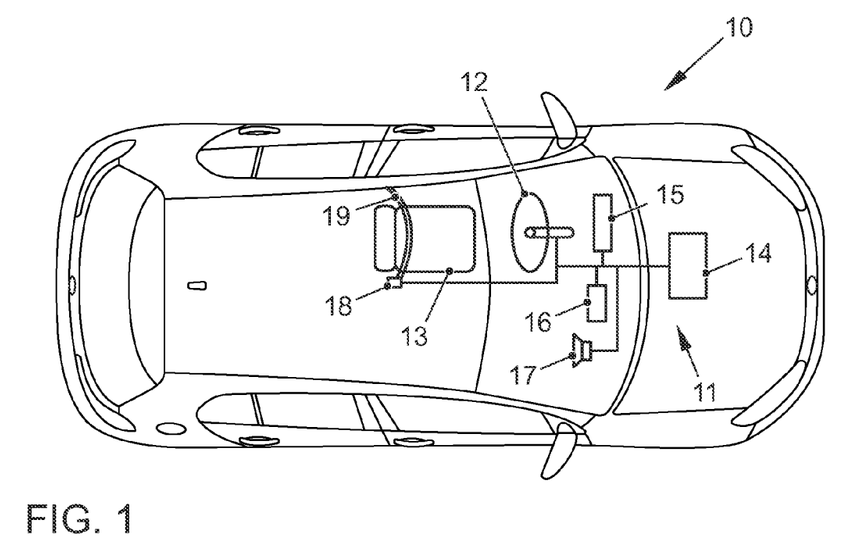
FIG. 1 schematically shows a vehicle according to an exemplary embodiment of the present invention.

FIG. 1 schematically shows a vehicle 10 having a driver assistance system 11. Vehicle 10 furthermore includes a steering wheel 12 and a driver's seat 13. Driver assistance system 11 includes a control device 14 and multiple output devices 15-18 in order to output warning signals or indication signals to a driver of vehicle 10. Output devices 15-18 include for example display devices 15 in an instrument cluster of vehicle 10, for example a display on which text information may be output, or warning lights. Another of the output devices is for example a fan control 16 by which a fan air jet may be produced or controlled in order to gain the driver's attention. Another of the output devices is a loudspeaker 17 for outputting acoustic signals in the form of voice signals or signal tones for example. A belt tensioner 18, which is coupled to a safety belt 19 of driver's seat 13, may likewise act as an output device for driver assistance system 11 in order to gain the attention of the driver by a brief jerk on safety belt 19. Another possible output device for driver assistance system 11 is for example a control of a brake system of vehicle 10 (not shown in FIG. 1) in order to produce a brief braking jerk by a brief activation of the brake for example.

Driver assistance system 11 is able to control vehicle 10 at least partially automatically. For this purpose, driver assistance system 11 is able automatically to control both a lateral guidance as well as a longitudinal guidance of vehicle 10 along at least some route sections of a driving route. The driver assistance system is thereby able to control vehicle 10 without activity of the driver at least in certain situations. This functionality of driver assistance system 11 for automatically controlling vehicle 10 is referred to herein as an autopilot function. The driver assistance system is for example able to determine continuously whether fully automatic travel using the autopilot function is possible and indicate this to the driver. The driver is then able to activate the autopilot function for example by actuating corresponding operating elements on steering wheel 12, whereby the autopilot function takes over the guidance of vehicle 10. Furthermore, the autopilot function may be activated for example by manually pushing steering wheel 12 away from the driver in the direction of the dashboard. If the driver wants to deactivate the autopilot function when it is activated, this may be achieved for example by actuating corresponding operating elements on steering wheel 12 or in that the driver manually pulls steering wheel 12 from the dashboard toward himself.

Depending on the capabilities of the autopilot function, vehicle 10 is able to be controlled fully automatically in different situations and on different road types such as expressways or country roads or in city traffic for example. A fully automatic control of the vehicle, however, is generally not possible in all situations or on all road types. In those cases, a manual control of vehicle 10 by the driver is required. Since in fully automatic autopilot driving the driver is generally not occupied with the task of driving, but with other tasks, it is necessary for the autopilot function to detect in a timely manner that a situation is imminent, in which the driver must guide the vehicle manually, in order to inform the driver in a timely manner of that fact and to give him the opportunity to switch off the autopilot function and to take over the vehicle guidance himself. This process, in which the driver is returned to the task of guiding the vehicle, is also called driver return.

Figure 2:
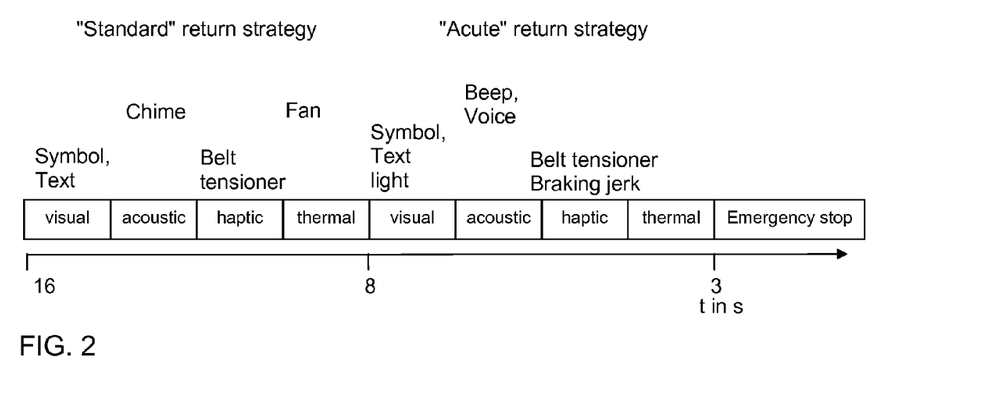
FIG. 2 schematically shows a multi-stage driver return concept of an autopilot function of a driver assistance system according to an exemplary embodiment of the present invention.

FIG. 2 describes a multi-stage method for driver return for the previously described transfer of responsibility from vehicle 10 to the driver. In the shown return strategy, there exists a period of a good 10-12 seconds, in which the driver is led back to the task of driving. The driver return accordingly does not occur in a very short time window, but slowly and thus comfortably for the driver. The driver return is divided into different stages, which build one upon the other and may run in parallel or individually. In some cases, for example when new situations or emergencies occur in short order, individual stages may be skipped.

In a first stage, for example in a time range of 8-12 seconds prior to an anticipated end of a fully automatic control by the autopilot function, the driver may be alerted in a gentle manner to a possible takeover. Since the driver during the piloted travel has possibly attended to activities that are not located in the central visual axis such as for example the dashboard or the instrument cluster, so-called diffuse modalities may be used, which are able to be perceived in a location-independent manner. Such diffuse modalities may be light animations in the interior of the vehicle, seat vibrations or fan jets for example. A modification of the interior, for example a movement of the steering wheel back into the original position, may also be used to indicate an imminent handover of responsibility for the task of driving to the driver. Additional passengers, who are also in the vehicle, may also be alerted to a driving mode change by these diffuse modalities.

In a second stage, which follows the first stage directly or runs in parallel to it, the driver may also be alerted acoustically by a muted chime to the imminent handover of the responsibility of driving to the driver. Likewise, specific instructions to take action may be represented for example on a display or by symbols (e.g. "please brake" or "please take over steering"). Corresponding voice outputs are likewise possible. Furthermore, the driver may be alerted by brief actuation of the belt tensioner to pay attention to the displays for example on the dashboard or instrument cluster.

The outputs of the first and second stage are relatively unobtrusive and therefore have only an indicative character. They may therefore be called standard return strategies.

This is followed by the third stage, the so-called acute return strategy. At this stage, the urgency of the imminent handover of the driving responsibility is supported by a corresponding development of the output modalities. Lights 15 in the dashboard or instrument cluster may flash, for example, loud warning tones may be output, a brake jerk may be produced via the brake system of the vehicle or corresponding voice instructions may be output via a loudspeaker 17. The outputs have a warning character. The reasons for the onset of this acute stage may lie with the driver himself or the environment as well as the system. The third stage may thus be initiated primarily if the driver, following a defined time period (first stage and second stage), has not established contact with the actuating parts of the vehicle such as e.g. the steering wheel or the foot controls or revealed no other actions for taking over the responsibility for driving. This third stage is preferably performed in a range of 3-8 seconds prior to a probable end of fully automatic travel.

The escalation of the indications and warnings may be varied for example as a function of the state of the driver. In the event of severe driver distraction or severe driver fatigue, the outputs of the third stage may be used earlier. The transition between the phases of the return is thus shaped by the state of the driver, which may be determined by various interior sensors, for example cameras. Furthermore, it is possible to vary the points in time of the outputs of the first through third stages as a function of a vehicle speed or a weather condition in the surroundings of the vehicle. Furthermore, current events in the surroundings of the vehicle, for example a vehicle swinging in front of vehicle 10 or a failure of an on-board sensor system of vehicle 10, may effect an immediate triggering of the outputs of the third stage.

In the transition to a higher stage, it is not necessary for the previous stages to be completed. An escalation in the form of an oscillation of a tone or a color change in an illumination toward warm colors and/or flashing is possible. As soon as the driver takes over the responsibility for driving, the outputs of the individual stages are deactivated. If the driver evidences no takeover of the responsibility for driving even at the end of the third stage, then an emergency stop stage sets in. This may occur for example 3 seconds prior to the anticipated end of the autopilot route section. The vehicle then automatically transitions into a minimum-risk state and drives to the roadway shoulder for example and stops. The occupants in the interior are informed about this state, via an acoustic output for example.

As described previously, the points in time at which the different indication or warning outputs are output may be adapted as a function of the state of the driver, a state of the vehicle and/or a state of the surrounding area. For example, warning outputs such as acoustic warning sounds and voice outputs or the actuation of the belt tensioner or the brake system of the vehicle, for example, may be output in a delayed manner if a camera or steering wheel sensors, for example, in the interior of the vehicle detect that the driver is turning towards the task of driving. Unnecessary warning outputs, which could disturb the driver, may thereby be avoided.

Figure 3:
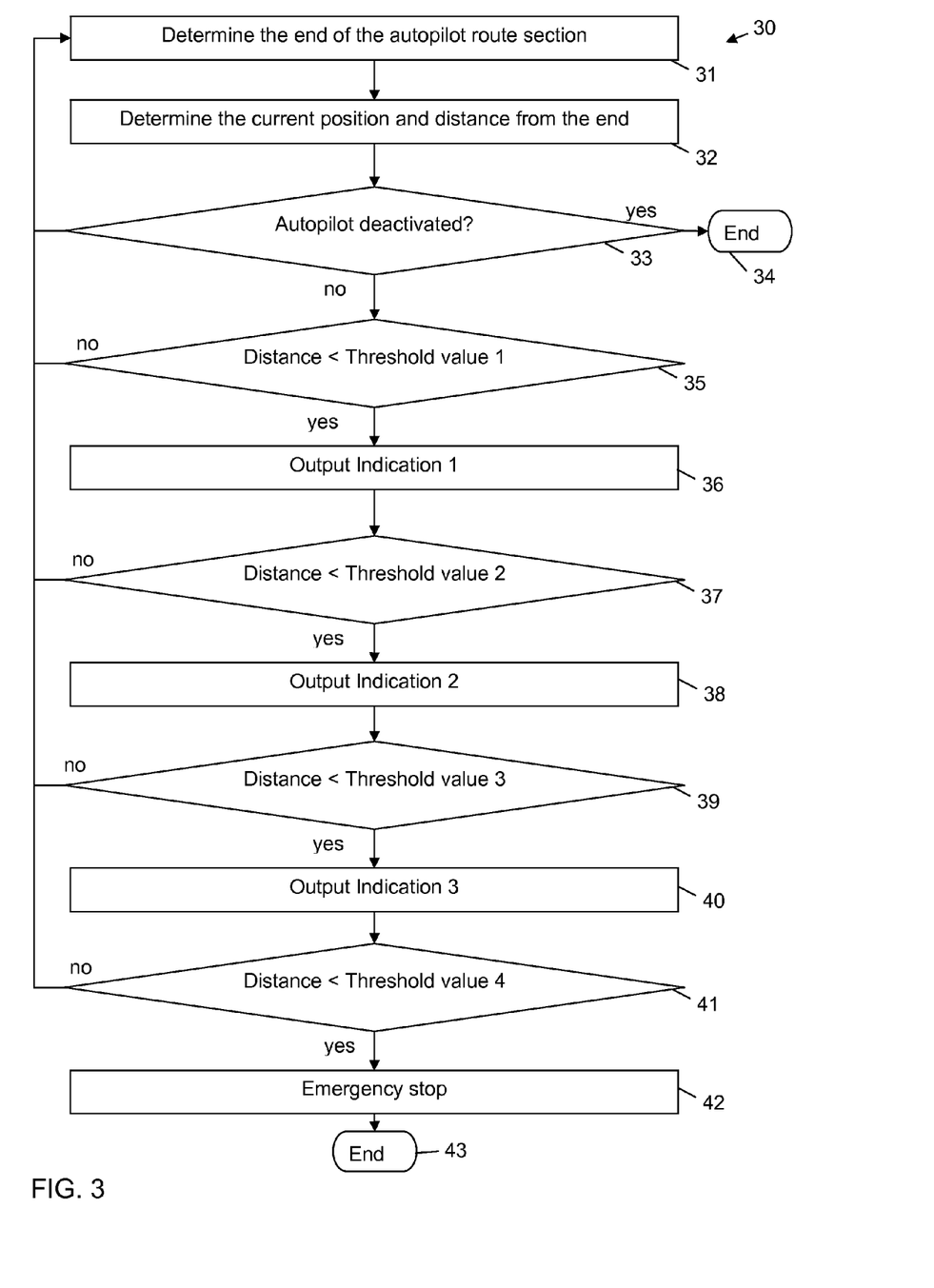
FIG. 3 shows method steps of a method according to an exemplary embodiment of the present invention.

The previously described method is represented schematically with reference to FIG. 3. FIG. 3 shows method steps 31-43 of a method 30, which may be carried out by processing device 14. Method 30 begins in a piloted driving operation, i.e. vehicle 10 is controlled essentially fully automatically by the autopilot function of driver assistance system 11. A navigation system of vehicle 10 has determined a route to a destination for example, and the autopilot function determines in step 31 an end of an autopilot route section, i.e. a location on the route, beginning with which the autopilot function will probably no longer be able to control the vehicle in a fully automatic manner. In step 32, the current position of the vehicle is determined, for example with the aid of signals of a global satellite position determination system, and a distance with respect to the end of the autopilot route section is calculated. By taking into account the current traffic situation and the route distance between the current position of vehicle 10 and the end of the autopilot route section, it is possible to calculate a probable driving time to the end of the autopilot route section. This time interval to the end of the autopilot route section is subsequently compared to different time threshold values in order to output corresponding indication outputs or warning outputs to the driver so as to prompt the driver in a timely manner prior to the end of the autopilot route section to take over the task of driving again manually. In step 33, an initial determination is made whether the driver has already taken over the responsibility for driving. In this case, the method is terminated in step 34 and no indications or warnings are output. Otherwise, a determination is made in step 35 as to whether the time interval is already smaller than a first threshold value of 16 seconds for example. If not, the method is continued in step 31. Otherwise, a first indication is output in step 36. This first indication may be an activation of a fan system of the vehicle, for example, or a display of a symbol or text on display 15 in the vehicle. In step 37, a check is performed as to whether the time interval to the end of the autopilot route section is already smaller than a second threshold value of 8 seconds for example. If this is not the case, then the method is continued in step 31. If the time interval is less than the second threshold value, then a second indication is output in step 38, for example an acoustic signal in the form of a chime or a light vibration in driver's seat 13 or a light tug on belt 19 with the aid of belt tensioner 18. Furthermore, a check is performed in step 39 as to whether the time interval to the end of the autopilot route section is already less than a third threshold value, for example less than 6 seconds. If not, the method is continued in step 31. Otherwise, a third indication, which has a very insistently warning character, is output in step 40. This may include for example a voice output with a corresponding instruction, a flashing of a warning light, a loud beeping signal, a forceful tug on belt 19 with the aid of belt tensioner 18 or a short activation of a brake system of the vehicle for producing a braking jerk. Furthermore, the third indication may include for example a strong activation of the fan with cold air for example in order to rouse the attention of the driver or other occupants of the vehicle. In step 41, a check is finally performed as to whether the distance with respect to the end of the autopilot route section has fallen below a fourth threshold and thus the time interval to the end of the autopilot route section is less than 3 seconds. In this case, an emergency stop of vehicle 10 is initiated in step 42 in that vehicle 10 is steered for example into the right lane or into a breakdown lane and is there brought to a standstill and additionally emergency flashers of vehicle 10 are activated. The method then ends in step 43.

LIST OF REFERENCE NUMERALS

10 Vehicle
11 Driver assistance system
12 Steering wheel
13 Driver's seat
14 Control device
15 Display device
16 Fan
17 Loudspeaker
18 Belt tensioner
19 Belt 30 Method
31-43 Step

What is claimed is:

1. A method for a driver assistance system of a vehicle, the driver assistance system able to control the vehicle at least partially automatically, the method comprising:
   determining an end of an autopilot route section in a route planned for the vehicle, the driver assistance system controlling the vehicle in the autopilot route section automatically and the automatic control ending at the end of the autopilot route section,
   determining a distance information between a current position of the vehicle and the end of the autopilot route section,
   comparing the distance information to a first threshold value,
   outputting a first indication as a function of the comparison of the distance information to the first threshold value,
   comparing the distance information to a second threshold value, wherein the second threshold value is smaller than the first threshold value, and
   outputting a second indication as a function of the comparison of the distance information to the second threshold value.

2. The method according to claim 1, wherein the output of the first or second indication comprises at least one of activating a lighting device in the interior of the vehicle, activating a fan device in the vehicle, activating a vibration device in a seat of the vehicle, outputting an acoustic signal in the vehicle, outputting a text information on a display unit in the vehicle, outputting an acoustic voice output in the vehicle, activating a belt tensioner in the vehicle, or activating a steering wheel adjustment of the vehicle.

3. The method according to claim 1, wherein the first indication is output if the distance information is smaller than the first threshold value, and the second indication is output if the distance information is smaller than the second threshold value.

4. The method according to claim 3, wherein outputting the second indication comprises:
   outputting an instruction to act, wherein the instruction describes an action to be carried out by the driver of the vehicle for guiding the vehicle.

5. The method according to claim 1, further comprising:
   comparing the distance information to a third threshold value, wherein the third threshold value is smaller than the first and second threshold value, and
   outputting a warning as a function of the comparison of the distance information to the third threshold value.

6. The method according to claim 5, wherein outputting the warning comprises at least one of: activating a lighting device in the interior of the vehicle, outputting an acoustic signal in the vehicle, outputting an acoustic voice output in the vehicle, activating a belt tensioner in the vehicle, activating a steering wheel adjustment of the vehicle, or activating a brake system of the vehicle in order to produce a brief jerky deceleration of the vehicle.

7. The method according to claim 5, further comprising:
   comparing the distance information to a fourth threshold value, wherein the fourth threshold value is smaller than the first, second and third threshold value, and
   automatically stopping the vehicle as a function of the comparison of the distance information to the fourth threshold value, or automatically steering the vehicle into a specific position in relation to the roadway as a function of the comparison of the distance information to the fourth threshold value.

8. The method according to claim 1, wherein the distance information between the current position of the vehicle and the end of the autopilot route section is determined as a probable driving time from the current position to the end of the autopilot route section.

9. The method according to claim 7, wherein the first threshold value has a value greater than 15 seconds, the second threshold value has a value in a range of 8 to 15 seconds, the third threshold value has a value in a range of 0 to 8 seconds, and the fourth threshold value has a value in a range of 0 to 5 seconds.

10. The method according to claim 7, further comprising:
    detecting an activity or state of a driver in the vehicle while the vehicle is guided automatically along the autopilot route section,
    setting the first, second, third or fourth threshold value as a function of the activity or the state of the driver.

11. The method according to claim 10, wherein detecting the activity of the driver comprises:
    detecting a touch of a steering wheel of the vehicle on the part of the driver, detecting a direction of view of the driver, detecting a foot position of the driver, or detecting a body position of the driver.

12. The method according to claim 7, further comprising:
    detecting a state information of the vehicle while the vehicle is guided automatically along the autopilot route section, and
    setting the first, second, third, or fourth threshold value as a function of the state information of the vehicle.

13. The method according to claim 7, further comprising:
    detecting a state information in the surroundings of the vehicle while the vehicle is guided automatically along the autopilot route section, and
    setting the first, second, third, or fourth threshold value as a function of the state information in the surroundings of the vehicle.

14. A driver assistance system for a vehicle, the driver assistance system able to control the vehicle at least partially automatically, the driver assistance system comprising:
    an output device, and
    a processing device, wherein the processing device is adapted to:
    determine an end of an autopilot route section in a route planned for the vehicle, the driver assistance system controlling the vehicle in the autopilot route section automatically and the automatic control ending at the end of the autopilot route section,
    determine a distance information between a current position of the vehicle and the end of the autopilot route section,
    compare the distance information to a first threshold value,
    output a first indication as a function of the comparison of the distance information to the first threshold value,
    compare the distance information to a second threshold value, wherein the second threshold value is smaller than the first threshold value, and
    output a second indication as a function of the comparison of the distance information to the second threshold value.

15. A method for a driver assistance system of a vehicle, the driver assistance system able to control the vehicle at least partially automatically, the method comprising:

determining an end of an autopilot route section in a route planned for the vehicle, the driver assistance system controlling the vehicle in the autopilot route section automatically and the automatic control ending at the end of the autopilot route section, determining a distance between a current position of the vehicle and the end of the autopilot route section, comparing the distance information to a first threshold value, outputting a first indication as a function of the comparison of the distance information to the first threshold value, comparing the distance information to a second threshold value, outputting a second indication as a function of the comparison of the distance information to the second threshold value, comparing the distance information to a third threshold value, wherein the third threshold value is smaller than the first and second threshold value, outputting a warning as a function of the comparison of the distance information to the third threshold value;

comparing the distance information to a fourth threshold value, wherein the fourth threshold value is smaller than the first, second and third threshold value, and automatically stopping the vehicle as a function of the comparison of the distance information to the fourth threshold value, or automatically steering the vehicle into a specific position in relation to the roadway as a function of the comparison of the distance information to the fourth threshold value.

16. A driver assistance system for a vehicle, the driver assistance system able to control the vehicle at least partially automatically, the driver assistance system comprising:

an output device, and a processing device, wherein the processing device is adapted to:

determine an end of an autopilot route section in a route planned for the vehicle, the driver assistance system controlling the vehicle in the autopilot route section automatically and the automatic control ending at the end of the autopilot route section, determine a distance information between a current position of the vehicle and the end of the autopilot route section, compare the distance information to a first threshold value, output a first indication as a function of the comparison of the distance information to the first threshold value, compare the distance information to a second threshold value, output a second indication as a function of the comparison of the distance information to the second threshold value, comparing the distance information to a third threshold value, wherein the third threshold value is smaller than the first and second threshold value, outputting a warning as a function of the comparison of the distance information to the third threshold value, comparing the distance information to a fourth threshold value, wherein the fourth threshold value is smaller than the first, second and third threshold value, and automatically stopping the vehicle as a function of the comparison of the distance information to the fourth threshold value, or automatically steering the vehicle into a specific position in relation to the roadway as a function of the comparison of the distance information to the fourth threshold value.

\* \* \* \* \*